United States Patent
Tsirkin (10) Patent No.: US 9,459,907 B2
(45) Date of Patent: Oct. 4, 2016

(54) GUEST CONTROLLED MALICIOUS PAYLOAD PROTECTION

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 14/630,181

(22) Filed: Feb. 24, 2015

(65) Prior Publication Data

US 2016/0246630 A1     Aug. 25, 2016

(51) Int. Cl.
| G06F 7/04 | (2006.01) |
|---|---|
| G06F 11/00 | (2006.01) |
| G06F 9/455 | (2006.01) |
| H04L 29/06 | (2006.01) |
| G06F 15/16 | (2006.01) |
| G06F 12/14 | (2006.01) |

(52) U.S. Cl.
CPC .......... G06F 9/45558 (2013.01); H04L 63/10 (2013.01); *G06F 2009/45587* (2013.01)

(58) Field of Classification Search
None
See application file for complete search history.

(56) References Cited

U.S. PATENT DOCUMENTS

| 8,214,878 | B1 * | 7/2012 | Hernacki | G06F 9/45558 726/1 |
|---|---|---|---|---|
| 8,745,745 | B2 | 6/2014 | Mooring et al. | |
| 2006/0005003 | A1 * | 1/2006 | Grobman | G06F 9/4812 713/2 |
| 2011/0093849 | A1 * | 4/2011 | Chawla | H04L 41/0816 718/1 |
| 2012/0151209 | A1 * | 6/2012 | Visnyak | H04L 9/3234 713/166 |
| 2013/0132690 | A1 * | 5/2013 | Epstein | G06F 12/145 711/159 |
| 2013/0227089 | A1 * | 8/2013 | McLeod | G06F 9/45558 709/220 |
| 2013/0326172 | A1 * | 12/2013 | Tsirkin | G06F 9/45558 711/162 |
| 2013/0340077 | A1 | 12/2013 | Salsamendi et al. | |
| 2014/0053272 | A1 * | 2/2014 | Lukacs | G06F 21/53 726/24 |
| 2014/0068612 | A1 * | 3/2014 | Torrey | G06F 9/45558 718/1 |
| 2014/0189690 | A1 | 7/2014 | Ramakrishnan | |
| 2014/0208123 | A1 | 7/2014 | Roth et al. | |
| 2014/0282539 | A1 | 9/2014 | Sonnek | |

OTHER PUBLICATIONS

LynuxWorks Debuts Industry's First Real-time Zero-Day Rootkit and Bootkit Defense; Real-Time Operating Systems and Virtualization for Safety and Security Application; Feb. 26, 2013, http.//www.lynx.com/press-release/lynuxworks-debuts-industrys-first-real-time-zero-day-rootkit-and-bootkit-defense/ (7 pages).

Wang et al., "Hypersafe: A Lightweight Approach to Provide Lifetime Hypervisor Control-Flow Integrity", Department of Computer Science, North Carolina State University (16 pages).

(Continued)

*Primary Examiner* — Dede Zecher
*Assistant Examiner* — Trang Doan
(74) *Attorney, Agent, or Firm* — K&L Gates LLP (57) ABSTRACT

A system, methods, and apparatus for guest controlled malicious payload protection. A request is received from a virtual machine to enable privileged access to a hypervisor resource. Responsive to the request, the hypervisor disables the virtual machine's access permissions to modify a configuration of the virtual machine. The hypervisor then determines whether the configuration is secure. If the hypervisor determines that the configuration is secure, it enables the privileged access to the hypervisor resource.

20 Claims, 6 Drawing Sheets

(56) References Cited

OTHER PUBLICATIONS

Pfoh et al., "Exploiting the x86 Architecture to Derive Virtual Machine State Information", 2010 Fourth International Conference on Emerging Security Information, Systems and Technologies; Department of Computer Science; Technische Universitat Munich, Munich Germany (10 pages).

Lutas, "From Ring3 to Ring0: Exploiting the Xen X86 Instruction Emulator", Bitdefender (13 pages).

Wojtczuk et al., "Following the White Rabbit: Software attacks against Intel VT-d technology", Invisible Things Lab, Apr. 2011 (27 pages).

\* cited by examiner

Default Page Table 181

| 310A x0001 | 320A Read-Only | 330A Global Descriptor Data Structure x03FF |
|---|---|---|
| 310B x0002 | 320B Read-Write | 330B Virtual Interrupt Data Structure x040F |
| 310C x0003 | 320C Executable | 330C Base Address Register x041F |
| 310D x0004 | 320D Executable Only | 330D VM Program x042F |
| 310E x0005 | 320E Inaccessible | 330E VM Program x043F |

Alternate Page Table 182

| 340A x0001 | 350A Read-Write | 360A Additional Shared Memory x01AF |
|---|---|---|
| 340B x0002 | 350B Executable Only | 360B VM Function x01FF |
| 340C x0003 | 350C Executable Only | 360C VM Function x024F |
| 340D x0004 | 350D Executable Only | 360D VM Function x029F |
| 340E x0005 | 350E Read-Write | 360E Virtual Device Memory x02EF |
| 340F x0006 | 350F Read-Write | 360F Virtual Device Memory x033F |

FIG. 3

Default Page View 410

- 430A  Global Descriptor Data Structure  Read-Only
- 430B  Virtual Interrupt Data Structure  Read-Write
- 430C  Base Address Register  Executable
- 430D  VM Code  Executable Only
- 430E  VM Code  Inaccessible Alternate Page View 420

- 440A  Additional Shared Memory  Read-Write
- 440B  VM Function  Executable Only
- 440C  VM Function  Executable Only
- 440D  VM Function  Executable Only
- 440E  Virtual Device Memory  Read-Write
- 440F  Virtual Device Memory  Read-Write

GUEST CONTROLLED MALICIOUS PAYLOAD PROTECTION

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system, methods and apparatus for guest controlled malicious payload protection.

In an example embodiment, a system includes memory, one or more processors, one or more virtual machine executing on the one or more physical processors, and a hypervisor executing on the one or more physical processors. A request is received from a virtual machine to enable privileged access to a hypervisor resource. Responsive to the request, the hypervisor disables the virtual machine's access permissions to modify a configuration of the virtual machine. The hypervisor then determines whether the configuration is secure. If the hypervisor determines that the configuration is secure, the hypervisor enables the privileged access to the hypervisor resource.

Additional features and advantages of the disclosed method and apparatus are described in, and will be apparent from, the following Detailed Description and the Figures.

DETAILED DESCRIPTION OF EXAMPLE EMBODIMENTS

Figure 1:
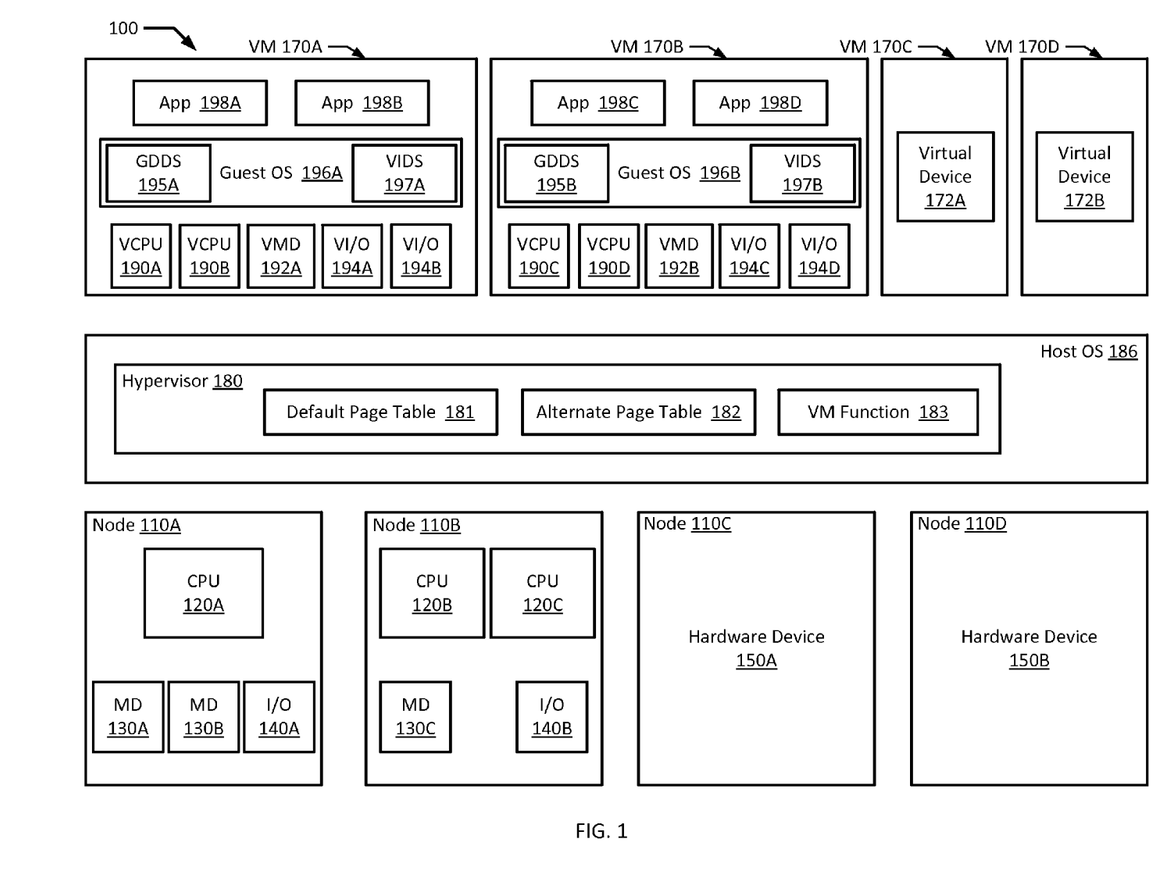
FIG. 1 is a block diagram of an example multiprocessor computer system according to an example embodiment of the present disclosure.

FIG. 1 depicts a high-level component diagram of an example multi-processor (or host) computer system 100 in accordance with one or more aspects of the present disclosure. The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI).

As noted above, computer system 100 may run multiple virtual machines (e.g., VM 170A-D), by executing a software layer (e.g., hypervisor 180) above the hardware and below the virtual machines 170A-D, as schematically shown in FIG. 1. In an example embodiment, the hypervisor 180 may be a component of the host operating system 186 executed by the computer system 100. In another example embodiment, the hypervisor 180 may be provided by an application running under the operating system 186, or may run directly on the host computer system 100 without an operating system beneath it. The hypervisor 180 may virtualize the physical layer, including processors, memory, and I/O devices, and present this virtualization to virtual machines 170A-D as devices, including virtual processors (e.g., VCPU 190A-D), virtual memory (e.g., VMD 192A-B), and/or virtual I/O devices (e.g., VI/O 194A-D).

Figure 2:
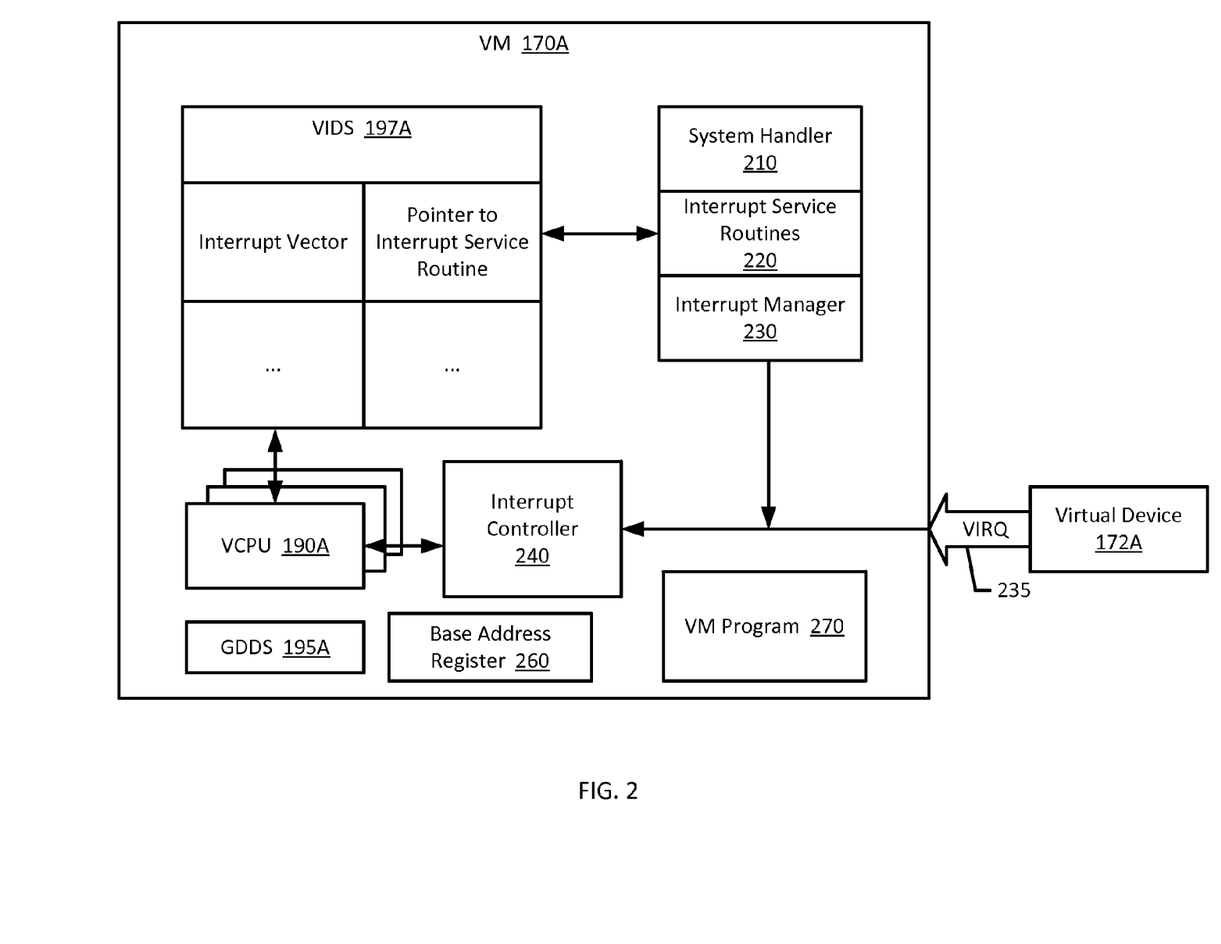
FIG. 2 is a block diagram of an example virtual machine according to an example embodiment of the present disclosure.

In an example embodiment, a virtual machine 170A-B may execute a guest operating system 196A-B which may utilize the underlying VCPU 190A-D, VMD 192A-B, and VI/O devices 194A-D. One or more applications 198A-D may be running on a virtual machine 170A-B under the guest operating system 196A-B. The guest operating system 196A-B may include a global descriptor data structure (GDDS) 195A-B and a virtual interrupt data structure (VIDS) 197A-B. Example embodiments of the GDDS (e.g., 195A) and VIDS (e.g., 197A) are described in greater detail below and as illustrated in FIG. 2.

In an example embodiment, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D.

In another example embodiment, a virtual machine 170C-D may include virtual devices 172A-B. A virtual device 172A-B may provide the functionality of traditional hardware devices such as network devices, storage devices, sound or video adaptors, photo/video cameras, printer devices, keyboards, displays, etc.

In an example embodiment, the hypervisor 180 may provide one or more virtual machine functions (VM Functions) 183 to a virtual machine 170A-D. The code that a VM Function 183 runs on the physical processor(s) 120A-C may utilize the resources of host operating system (Host OS) 186, such as the memory devices 130A-C, and the input/output devices 140A-B as well as the resources of one or more of the virtual machines 170A-D including the virtual processors 190A-D, the virtual memory 192A-B, and the virtual I/O devices 194A-D. For example, the VM Function 183 may be called by a VM 170A to transfer data to, or access the resources of another VM (e.g., 170B). By contrast, each VM 170A may be limited to the use of its own resources including its VCPUs (e.g., 190A-B), virtual memory (e.g., 192A), and virtual I/O devices (e.g., 194A-B) unless it invokes a VM Function 183 as described below.

In an example embodiment, the VM Function 183 may be invoked for a VM 170A, by the guest OS 196A that is running on the VM 170A. In an example embodiment, a VM Function 183 may only be invoked if hypervisor 180 provides permission or grants a request. For example, a VM 170A or guest OS 196A may invoke a VM Function 183 to handle a task more efficiently or using greater resources than are presently available to the VM 170A or guest OS 196A. In an example embodiment, the hypervisor 180 may also deny the request by causing an undefined opcode exception or a general protection fault exception whenever the VM Function 183 is invoked.

Figure 3:
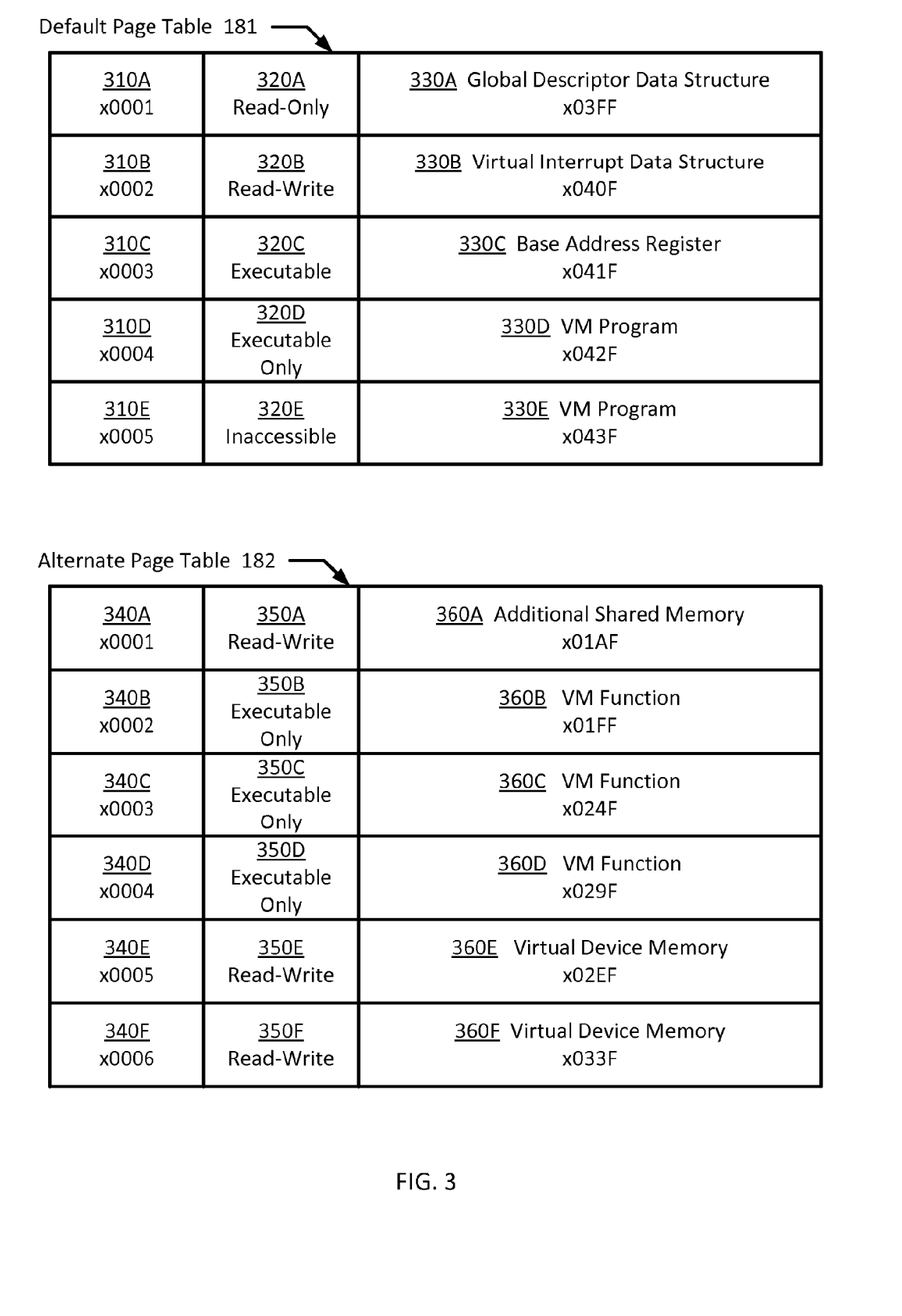
FIG. 3 a block diagram of an example default page table and alternate page table according to an example embodiment of the present disclosure.

The hypervisor may also include a default page table 181 and an alternate page table 182. Example embodiments of these data structures are described in greater detail below and as shown in FIG. 3.

FIG. 2 illustrates an example embodiment of a virtual machine 170A. During operation, an event may be triggered by the operation of virtual device 172A. The virtual device 172A can report the event by sending a virtual interrupt request (VIRQ 235) to one of the VCPUs 190A via an interrupt controller 240. The VIRQ 235 is sent with an interrupt vector that is assigned to the event. As explained below, the VIRQ 235 is passed to a system handler 210, which consults a virtual interrupt data structure (VIDS) 197, using the interrupt vector as an index. The VIDS 197 associates each interrupt vector with an interrupt service routine 220. For example, the VIDS 197 is indexed by interrupt vectors, allowing the system handler 210 to use interrupt vectors to locate pointers to the corresponding interrupt service routines 220. The interrupt service routines 220 may then handle the event by causing the VCPU 190 to execute event handling code to perform appropriate operations.

A global descriptor data structure 195A stores information pertaining to program execution on the VCPU 190A including segment descriptors and access protection flags defining the protection status of the VCPU's 190A segment descriptors. The VM 170A may also include a base address register 260, that stores the physical base address and length of the VIDS 197A. The VM 170A may also include additional VM programs 270 executed by the VM 170A.

The present disclosure is not limited to the structure of the system illustrated in FIG. 2. In an example embodiment, the system handler 210, interrupt service routines 220, and interrupt manager 230 may be on the hypervisor 180. In another example embodiment, a virtual device may be a on a a virtual machine similar to VM 170C-D that is not managed by hypervisor 180 and that is external to system 100. In yet another example embodiment, the source of the interrupt may be a traditional hardware device (such as a network device, storage device, sound or video adaptor, photo/video camera, printer device, keyboard, display, etc.) that is managed by system 100. In yet another example embodiment, the source of the interrupt may be a traditional hardware device (such as a network device, storage device, sound or video adaptor, photo/video camera, printer device, keyboard, display, etc.) that is external to system 100.

Figure 4:
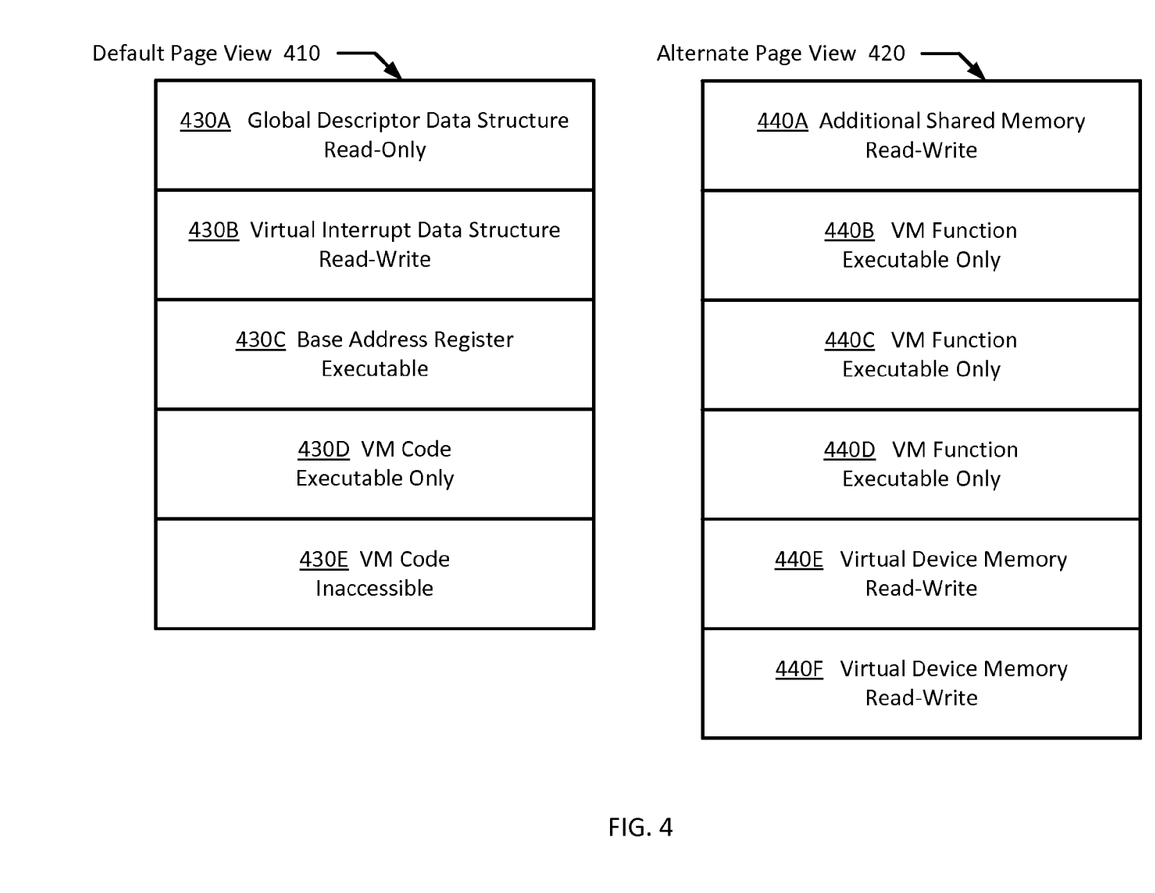
FIG. 4 is a block diagram of example page views and pages according to an example embodiment of the present disclosure.

FIG. 3 illustrates a default page table 181 and an alternate page table 182 according to an example embodiment of the present disclosure. In general, the hypervisor 180 manages the memory usage of the VMs 170A-D. Both virtual memory and physical memory may be divided into pages which are identified with a unique number (e.g., Page Frame Number (PFN) 310A-E or 340A-F). Example embodiments of pages and page views are described in greater detail below and as shown in FIG. 4.

A page table is a data structure used by the hypervisor 180 to store a mapping of physical addresses for the guest (e.g., used by the guest OS 196A on VM 170A) to physical addresses for the host (e.g., used by the host hardware platform 100). Accordingly, address translation from guest-physical to host-physical memory addresses is handled using page tables 181 (or 182). For example, each process or application operating within the VMs 170A-D may be given the impression that there is a contiguous section of memory available, when in reality, the available memory may be spread across various memory devices 130A-C.

The page tables 181 and 182 comprise entries that map a virtual PFN 310A-E (or 340A-F) with a physical address 330A-E (or 360A-F). The page tables 181 and 182 may be used together with any paging data structure used by the VMs 170A-D to support translation from virtual to physical addresses (e.g., 32-bit linear address space using a two-level hierarchical paging structure, Physical Address Extension mode, INTEL Extended Memory 64 Technology mode, etc.).

In an example embodiment, page tables 181 and 182 may also include a protection identifier 320A-E (or 350A-F). The protection identifier 320A-E (or 350A-F) indicates the access protection status of a page for the page view described by the page table 181 (or 182). A protection status may used to define, for example, that a given page is writable (or read-write), write-protected (or read-only), executable (or executable and readable), executable only, inaccessible (or non-present), etc. For example, in FIG. 3, the page associated with virtual PFN x0001 and memory location x03FF has been defined in default page table 181 as 'Read-Only'. The page associated with virtual PFN x0001 is associated with memory location x01AF in alternate page table 182 and has been defined as 'Read-Write'. The hypervisor 180 may be used to control to protection status of pages. In addition, in an example embodiment, the page tables 181 and 182 may include additional information not shown in FIG. 3 including statistics information, background information, dirty identifiers which indicate that modifications to a page must be written back to disk, etc.

In an example embodiment, one or more default page tables 181 may be maintained by the hypervisor 180 for each of the VMs 170A-D which maps virtual addresses to physical addresses that are accessible by each of the VMs 170A-D. For example, one or more default page tables 181 may be maintained by the hypervisor 180 for the GDDS 195A-B which maps virtual addresses to physical addresses corresponding to the GDDS 195A-B. One or more default page tables 181 may be maintained by the hypervisor 180 for the VIDS 197A-B which maps virtual addresses to physical addresses corresponding to the VIDS 197A-B. One or more default page tables 181 may be maintained by the hypervisor 180 for the base address register 260 which maps virtual addresses to physical addresses corresponding to the base address register 260. One or more default page tables 181 may be maintained by the hypervisor 180 for VM programs 270 on the VM 170A-D which maps virtual addresses to physical addresses corresponding to the VM program 270. In an example embodiment, a portion of the entries in a default page table 181 (e.g., 330A) may correspond to the location of the memory corresponding to the GDDS 195A-B (e.g., 430A), a portion of the entries in a default page table 181 (e.g., 330B) may correspond to the location of the memory corresponding to the VIDS 197A-B (e.g., 430B), a portion of the entries in a default page table 181 (e.g., 330C) may correspond to the location of the memory corresponding to the base address register 260 (e.g., 430C), and a portion of the entries in a default page table 181 (e.g., 330D-E) may correspond to the location of the memory corresponding to the VM program 270 (e.g., 430D-E). In an example embodiment, in addition to a default page table 181 corresponding to VM 170A-D, one or more alternate page tables 182 may additionally be maintained by the hypervisor 180 for the VM 170A-D.

The following serves as an example embodiment of how system 100 uses page tables (e.g., default page table 181 and/or alternate page table 182). In an example embodiment, the page table entry in the default page table 181 corresponding to the virtual PFNs (e.g., 310B) of an interrupt data structure VIDS 197A on the VM 170A is accessed by physical CPU (e.g., 120A) when looking up pointers to interrupt service routines. The pointers to these interrupt service routines themselves provide a virtual PFN that is consulted in the default page table 181 to convert the pointers to physical addresses of the host computer system 100. In an example embodiment, in order to convert a virtual PFN to a host physical address, the hypervisor 180 may also consult default page table 181, together with any paging data structure that the VMs 170 use to support translation from virtual to physical addresses.

One or more alternate page tables 182 may be maintained by the hypervisor 180 for each of one or more VM Functions 183 which maps virtual addresses to physical addresses that are accessible by each of the VM Functions 183. Furthermore, one or more alternate page tables 182 may be maintained by the hypervisor 180 for each of one or more virtual devices 172A-B which maps virtual addresses to physical addresses that are accessible by each of the virtual devices 172A-B. One or more alternate page tables 182 may additionally be maintained by the hypervisor 180 for additional shared memory resources (e.g., VMD 192B or MD 130A-C) that are not presently allocated to a VM 170A. In an example embodiment, a portion of the entries in an alternate page table 182 (e.g., 360A) may correspond to the location of the additional shared memory (e.g., 440A), a portion of the entries in an alternate page table 182 (e.g., 360B-D) may correspond to the location of the VM Function 183 (e.g., 440B-D), and a portion of the entries in an alternate page table 182 (e.g., 360E-F) may correspond to the physical location of the memory of a virtual device 172A-B (e.g., 440E-F). In an example embodiment, in addition to a default page table 181 corresponding to the VIDS 197A of VM 170A, one or more alternate page tables 182 may additionally be maintained by the hypervisor 180 for the VIDS 197A.

As illustrated in FIG. 3, in an example embodiment, an alternate page table 182 may be more expansive than a default page table 181 in order to permit the VM Functions 183 to access a larger set of memory resources than the VMs 170 have access to. However, the sizes of different page tables may vary and that the degree of overlap between different page tables may vary (e.g., there may be no overlap).

FIG. 4 illustrates page views and pages, for example a default page view 410, an alternate page view 420, and pages 430A-E and 440A-F, in accordance with an example embodiment of the present disclosure. As noted above, a page may be a portion of physical or virtual memory designated for storing data. As used herein, a page view denotes a mapping from guest-physical addresses to host-physical addresses. For example, a default page view 410 is a page view that is referenced by a default page table 181. In an example embodiment, the default page view 410 may denote the mapping from virtual PFNs of a VM 170 to host-physical addresses, as used during normal execution of the virtual machine. An alternate page view 420 is a page view that is referenced by an alternate page table 182. In an example embodiment, the alternate page view 420 may denote a mapping from addresses designated for use by the additional shared memory, VM Function 183, or virtual device 172A-B to host-physical addresses. As illustrated in FIG. 4, pages (e.g., 430A and 440A) may be defined by access protections (described above in more detail) such as 'Read-Only' or 'Read-Write' in accordance with their respective page table protection identifiers (e.g., 320A and 350A). A VM Function 183 may change the mapping of guest-physical addresses to host-physical addresses, e.g., page views 410 or 420, by changing the page tables 181 or 182 that the processor 120 uses to perform memory accesses in the VM 170.

Figure 5:
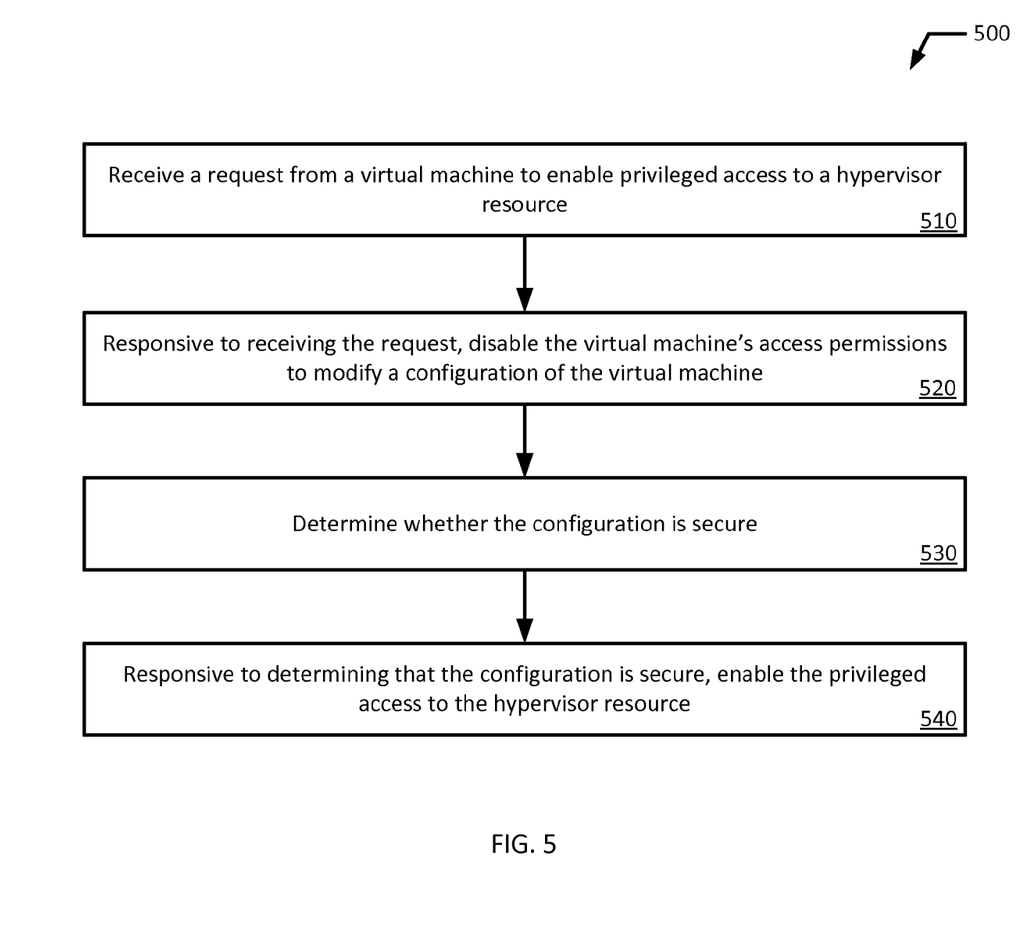
FIG. 5 is a flowchart illustrating an example process for guest controlled malicious payload protection according to an example embodiment of the present disclosure.

FIG. 5 illustrates a flowchart of an example method 500 for guest controlled malicious payload protection. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example embodiment, the method is performed by a hypervisor 180.

The example method 500 starts and the hypervisor 180 receives a request from a virtual machine 170A to enable privileged access to a hypervisor resource (block 510). In an example embodiment, a hypervisor resource may be additional shared memory 440A, one or more VM Functions 183, one or more virtual devices 172A-B, and/or one or more hardware resources on system 100 (e.g., CPU 120A-C, MD 130A-C, I/O 140A-B, and/or hardware device 150A-B). In an example embodiment, the request may be a message requesting access to additional shared memory 440A, one or more VM Functions 183, one or more virtual devices 172A-B, and/or one or more hardware resources on system 100 (e.g., CPU 120A-C, MD 130A-C, I/O 140A-B, and/or hardware device 150A-B). In an example embodiment, the request may be a message from the virtual machine 170A requesting malicious payload protection. In an example embodiment, the request may instead be a notification by the virtual machine 170A that it will not modify a configuration of the virtual machine.

Responsive to receiving the request, the hypervisor 180 may disable the virtual machine's 170A access permissions to modify a configuration of the virtual machine 170A (block 520).

In an example embodiment, a configuration of the virtual machine 170A may include an interrupt data structure VIDS 197A, a global descriptor data structure GDDS 195A, one or more base address registers 260 associated with the processors VCPU 190A, and code of the virtual machine, such as system handlers 210, interrupt service routines 220, and any other VM program 270 that may be executed of the virtual machine.

Disabling a virtual machine's 170A access permissions to modify a configuration may be done in a variety of ways. In an example embodiment, the hypervisor 180 may disable a virtual machine's 170A access to modify a configuration by changing an access protection status of one or more entries in a default page table 181 corresponding to the configuration. In another example embodiment, hypervisor 180 may disable a virtual machine's 170A access to modify a configuration by changing an access protection status of one or more entries in an alternate page table 182 corresponding to the configuration. In an example embodiment, the hypervisor 180 may first determine which page entries and/or page views are associated with a configuration that it seeks to disable prior to modifying the access protection status.

In an example embodiment, upon determining that a default page table 181 is mapped to the virtual machine's 170A interrupt data structure VIDS 197A, the hypervisor 180 may modify the appropriate protection identifiers 310B to restrict the virtual machine's 170A access to pages corresponding to the interrupt data structure VIDS 197A. For example, the hypervisor 180 may modify a protection identifier 310B corresponding to a page entry 330B of one or more interrupt service routines 220 of the interrupt data structure VIDS 197A to 'Executable-Only,'Read-Only,' or 'Inaccessible.' The hypervisor 180 may similarly disable the virtual machine's 170A access permissions to the GDDS 195A (e.g., by modifying a protection identifier 310A corresponding to a page entry 330A) the base address register 260 (e.g., by modifying a protection identifier 310C corresponding to a page entry 330C), and/or the VM program 270 (e.g., by modifying a protection identifier 310D-E corresponding to a page entry 330D-E).

In an example embodiment, the hypervisor 180 may disable a virtual machine's 170A access to modify a configuration by configuring a CPU 120A or a VCPU 190A so that an attempt by the virtual machine 170A to access the configuration will cause an exit to the hypervisor 180.

The hypervisor 180 may then determine whether the configuration is secure (block 530). In an example embodiment, the hypervisor 180 may determine whether a configuration is secure by determining whether the virtual machine 170A has a malicious payload. This determination may be made in a variety of ways. In an example embodiment, the hypervisor 180 may scan code and memory associated with the virtual machine 170A for any known forms of malicious payloads. In another example embodiment, the hypervisor 180 may compare a configuration of the virtual machine 170A against an expected value to determine whether the configuration has been altered. If the configuration has been altered, the hypervisor 180 may determine that the configuration is not secure and if the configuration has not been altered, the hypervisor 180 may determine that the configuration is secure. For example, the hypervisor 180 may compare system handlers 210, the interrupt service routines 220, and/or VM programs 270 of the virtual machine 170A against expected code to determine whether the code of the virtual machine 170A has been altered. In an example embodiment, the expected code is unaltered code maintained by the hypervisor 180 and was originally provided to the virtual machine 170A as part of the creation of the virtual machine 170A.

In another example embodiment, the hypervisor 180 may compare the interrupt vectors or pointers to interrupt service routines of the interrupt data structure VIDS 197A of the virtual machine 170A against an expected value to determine whether the interrupt data structure VIDS 197A has been altered. In yet another example embodiment, the hypervisor 180 may compare the segment descriptors and access protection flags of the GDDS 195A against an expected value to determine whether the GDDS 195A has been altered. In yet another example embodiment, the hypervisor 180 may compare the base address register 260 against an expected value to determine whether the base address register 260 has been altered. In an example embodiment, the expected value is unaltered data maintained by the hypervisor 180 and was originally provided to the virtual machine 170A as part of the creation of the virtual machine 170A.

In an example embodiment, the hypervisor 180 may disable the virtual machine's 170A permissions to modify more than one configuration of the virtual machine 170A. In an example embodiment, the hypervisor 180 may disable the virtual machine's 170A permissions to modify all the configurations of the virtual machine 170A.

Responsive to determining by the hypervisor 180 that the configuration is secure, the hypervisor 180 may enable the virtual machine's 170A privileged access to the hypervisor resource (block 540). In an example embodiment, privileged access refers to permissions that allow a VM 170A direct access to a hypervisor resource to which the VM 170A either did not have access or only had indirect access (via requests to the hypervisor 180) before the privileged access was granted. In an example embodiment, the hypervisor 180 may enable privileged access to the hypervisor resource for the virtual machine 170A by mapping an alternate page table 182 or one or more entries of an alternate page table 182 corresponding to the hypervisor resource to the virtual machine 170A and setting access protections to enable access for the virtual machine 170A to the hypervisor resource. For example, to enable access for the virtual machine 170A to additional shared memory 440A, the hypervisor 180 may map the page entry 360A corresponding to the additional shared memory 440A to the virtual machine 170A and set the protection identifier 350A to 'Read-Write' to allow the virtual machine to read and write to the additional memory. In another example embodiment, to enable access for the virtual machine 170A to a VM Function 183 440B-D, the hypervisor 180 may map the page entry 360B-D corresponding to the VM Function 183 440B-D to the virtual machine 170A and set the protection identifier 350B-D to 'Executable-Only' to allow the virtual machine to execute one or more VM Functions 183. In yet another example embodiment, to enable access for the virtual machine 170A to a virtual device 172A, the hypervisor 180 may map the page entry 360E-F corresponding to the memory 440E-F of the virtual device 172A to the virtual machine 170A and set the protection identifier 350E-F to 'Read-Write' to allow the virtual machine to read and write to the memory 440E-F of the virtual device 172A and communicate efficiently with the virtual device 172A.

In an example embodiment, in enabling privileged access to the hypervisor resource, the hypervisor 180 may additionally set a flag of the virtual machine 170A or a bit of the alternate page table 182 so that invoking a privileged instruction does not cause an exit to the hypervisor 180.

Figure 6:
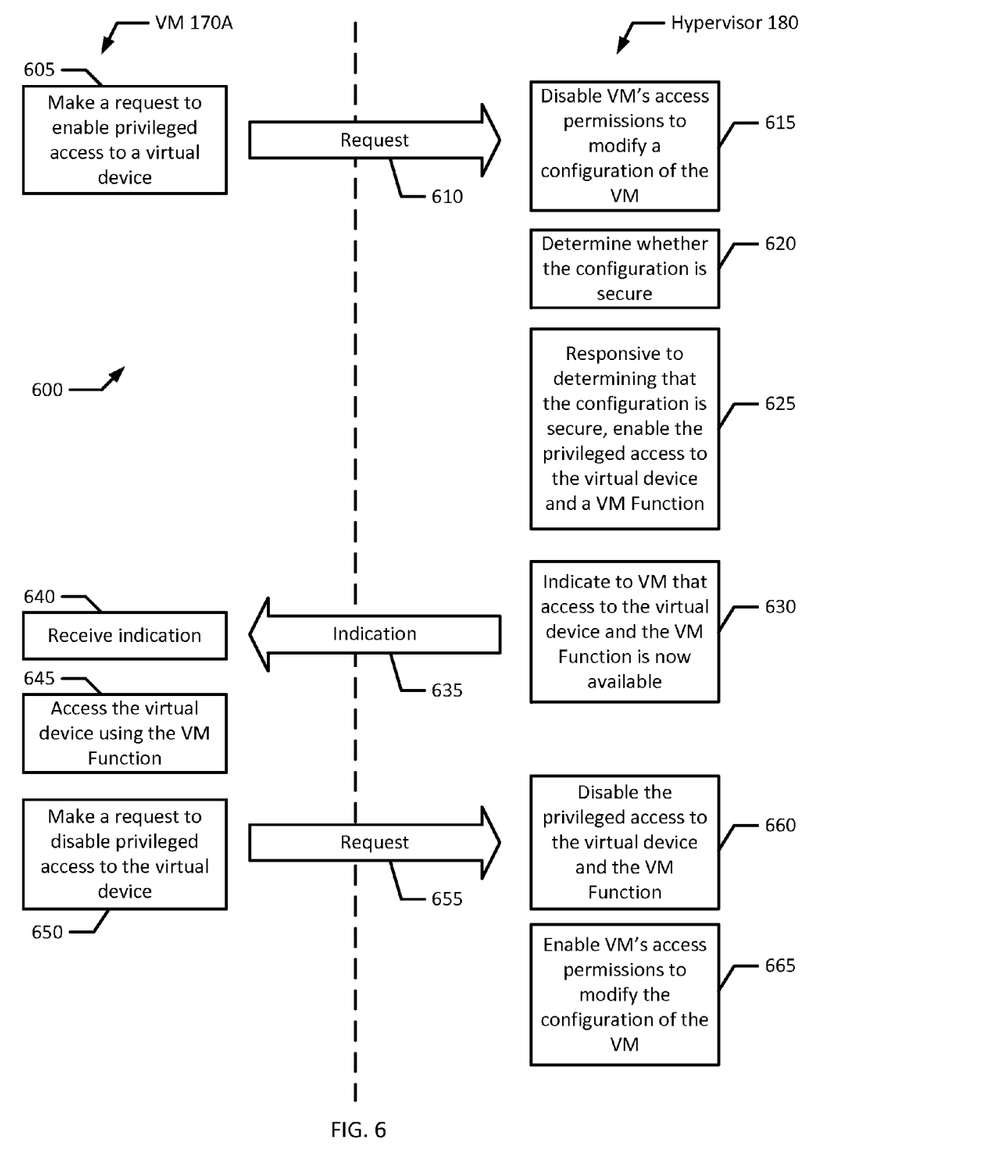
FIG. 6 is a flow diagram illustrating an example process for guest controlled malicious payload protection according to an example embodiment of the present disclosure.

FIG. 6 illustrates a flow diagram of an example process 600 for guest controlled malicious payload protection in accordance with an example embodiment of the present disclosure. In the illustrated example embodiment, the virtual machine 170A makes a request to enable privileged access to a virtual device 172A (block 605). The virtual machine 170A transmits the request to the hypervisor 180 (block 610).

Upon receiving the request, the hypervisor 180 disables the virtual machine's 170A access permissions to modify a configuration of the virtual machine 170A (block 615). In an example embodiment, the hypervisor 180 disables the virtual machine's 170A access permissions to modify the interrupt data structure VIDS 197A of the virtual machine 170A. In another example embodiment, the hypervisor 180 disables the virtual machine's 170A access permissions to modify the interrupt data structure VIDS 197A, the GDDS 195A, one or more base address registers 260 associated with the processors VCPU 190A-B, and the code of the virtual machine 170A including system handlers 210, interrupt service routines 220, and any other VM program 270.

In another example embodiment, responsive to receiving an request from a virtual machine 170A to enable privileged access to a hypervisor resource, the hypervisor 180 may begin by setting a trap to the hypervisor 180 if a virtual machine 170A attempts to access and/or modify a configuration of the virtual machine 170A. Then, if the virtual machine 170A attempts to access the configuration, this will cause an exit to the hypervisor 180.

Returning to example process 600, the hypervisor 180 may then determine whether the configuration is secure (block 620). Responsive to determining that the configuration is secure, the hypervisor 180 may enable privileged access to the virtual device 172A and a VM Function 183 (block 625). In an example embodiment, the VM Function 183 facilitates efficient communication between the virtual machine 170A and the virtual device 172A. In another example embodiment, the hypervisor 180 may only enable access to the requested hypervisor resource, the virtual device 172A. In yet another example embodiment, the hypervisor 180 may enable access to hypervisor resources in addition to the requested hypervisor resource, such as the virtual device 172A, a VM Function 183, and additional shared memory 440A).

The hypervisor 180 may then indicate to the virtual machine 170A that access to the virtual device 172A and the VM Function 183 is available to the virtual machine 170A (block 630). The hypervisor 180 may transmit the indication to the virtual machine 170A (block 635). The virtual machine 170A may then receive the indication (block 640). Responsive to receiving the indication, the virtual machine 170A may access the hypervisor resources to which privileged access has been enabled. For example, the virtual machine 170A may access the virtual device 172A using the VM Function 183 (block 645). The virtual machine 170A may then make a request to disable privileged access to the virtual device 172A (block 650). In an example embodiment, the virtual machine 170A may make the request to disable privileged access to the requested hypervisor resource upon completing one or more tasks using the hypervisor resource. In an example embodiment, the request to disable privileged access may be a request to regain the ability to modify configurations of the virtual machine 170A. The virtual machine 170A may then transmit the request to the hypervisor 180 (block 655).

Responsive to receiving the request, the hypervisor 180 may disable privileged access to the one or more hypervisor resources to which the hypervisor 180 enabled access as described above with respect to block 630. For example, the hypervisor 180 may disable privileged access to the virtual device 172A and VM Function 183 (block 660). In an example embodiment, disabling privileged access to a hypervisor resource includes unmapping from the virtual machine 170A the one or more alternate page tables 182 or portions of one or more alternate page tables 182 corresponding to the hypervisor resource.

The hypervisor 180 may then enable the virtual machine's 170A access permissions to modify the configuration of the virtual machine 170A. In an example embodiment, enabling access permissions to modify the configuration includes modifying the protection identifiers (e.g., 320A-E) corresponding to a page table (e.g., default page table 181) of the virtual machine 170A to re-enable the VM's access to the configuration.

In another example embodiment, the hypervisor 180 may enable the virtual machine's 170A access permissions to modify the configuration of the virtual machine 170A in response to detecting a reset of the virtual machine 170A.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system comprises a memory, one or more processors, in communication with the memory, one or more virtual machines executing on the one or more processors, each virtual machine including one or more configurations, a hypervisor, including one or more resources, executing on the one or more processors to receive, from the virtual machine, a request to enable privileged access to a hypervisor resource, responsive to receiving the request, disable, by the hypervisor, the virtual machine's access permissions to modify a configuration of the virtual machine, determine, by the hypervisor, whether the configuration is secure, and responsive to determining by the hypervisor that the configuration is secure, enable, by the hypervisor, the privileged access to the hypervisor resource. In accordance with another example aspect of the present disclosure, which may be used in combination with the first aspect, the request is a notification that the virtual machine will not modify the configuration. In accordance with another example aspect of the present disclosure, which may be used in combination with any one or more of the preceding aspects, the configuration includes an interrupt data structure, and wherein disabling, by the hypervisor, the virtual machine's access permissions includes disabling the virtual machine's access to modify the interrupt data structure. In accordance with another example aspect of the present disclosure, which may be used in combination with any one or more of the preceding aspects, the configuration includes a base address register of an interrupt data structure, and wherein disabling, by the hypervisor, the virtual machine's access permissions includes disabling the virtual machine's access to modify the base register of the interrupt data structure. In accordance with another example aspect of the present disclosure, which may be used in combination with any one or more of the preceding aspects, the configuration includes a global descriptor data structure, and wherein disabling, by the hypervisor, the virtual machine's access permissions includes disabling the virtual machine's access to modify the global descriptor data structure. In accordance with another example aspect of the present disclosure, which may be used in combination with any one or more of the preceding aspects, determining, by the hypervisor, whether a configuration is secure includes determining whether the virtual machine has a malicious payload. In accordance with another example aspect of the present disclosure, which may be used in combination with any one or more of the preceding aspects, determining, by the hypervisor, whether a configuration is secure includes determining whether the virtual machine has a malicious payload. In accordance with another example aspect of the present disclosure, which may be used in combination with any one or more of the preceding aspects, determining, by the hypervisor, whether a configuration is secure includes determining whether the virtual machine has a malicious payload.

In a second example aspect of the present disclosure, a method comprises receiving, from a virtual machine, a request to enable privileged access to a hypervisor resource, responsive to receiving the request, disabling, by a hypervisor executing on a computer system, the virtual machine's access permissions to modify a configuration of the virtual machine, determining, by the hypervisor, whether the configuration is secure, and responsive to determining by the hypervisor that the configuration is secure, enabling, by the hypervisor, the privileged access to the hypervisor resource. In accordance with another example aspect of the present disclosure, which may be used in combination with any one or more of the preceding aspects, the request is a notification that the virtual machine will not modify the configuration. In accordance with another example aspect of the present disclosure, which may be used in combination with any one or more of the preceding aspects, the configuration includes an interrupt data structure, and wherein disabling, by the hypervisor, the virtual machine's access permissions includes disabling the virtual machine's access to modify the interrupt data structure. In accordance with another example aspect of the present disclosure, which may be used in combination with any one or more of the preceding aspects, the configuration includes a base address register of an interrupt data structure, and wherein disabling, by the hypervisor, the virtual machine's access permissions includes disabling the virtual machine's access to modify the base register of the interrupt data structure. In accordance with another example aspect of the present disclosure, which may be used in combination with any one or more of the preceding aspects, the configuration includes a global descriptor data structure, and wherein disabling, by the hypervisor, the virtual machine's access permissions includes disabling the virtual machine's access to modify the global descriptor data structure. In accordance with another example aspect of the present disclosure, which may be used in combination with any one or more of the preceding aspects, determining, by the hypervisor, whether a configuration is secure includes determining whether the virtual machine has a malicious payload. In accordance with another example aspect of the present disclosure, which may be used in combination with any one or more of the preceding aspects, determining, by the hypervisor, whether a configuration is secure includes determining whether the virtual machine has a malicious payload. In accordance with another example aspect of the present disclosure, which may be used in combination with any one or more of the preceding aspects, determining, by the hypervisor, whether a configuration is secure includes determining whether the virtual machine has a malicious payload.

In a third example aspect of the present disclosure, a computer-readable non-transitory storage medium comprises executable instructions that, receive, from a virtual machine, a request to enable privileged access to a hypervisor resource, responsive to receiving the request, disable, by a hypervisor executing on a computer system, the virtual machine's access permissions to modify a configuration of the virtual machine, determine, by the hypervisor, whether the configuration is secure, and responsive to determining by the hypervisor that the configuration is secure, enable, by the hypervisor, the privileged access to the hypervisor resource. In accordance with another example aspect of the present disclosure, which may be used in combination with any one or more of the preceding aspects, the request is a notification that the virtual machine will not modify the configuration. In accordance with another example aspect of the present disclosure, which may be used in combination with any one or more of the preceding aspects, the configuration includes an interrupt data structure, and wherein disabling, by the hypervisor, the virtual machine's access permissions includes disabling the virtual machine's access to modify the interrupt data structure. In accordance with another example aspect of the present disclosure, which may be used in combination with any one or more of the preceding aspects, the configuration includes a base address register of an interrupt data structure, and wherein disabling, by the hypervisor, the virtual machine's access permissions includes disabling the virtual machine's access to modify the base register of the interrupt data structure. In accordance with another example aspect of the present disclosure, which may be used in combination with any one or more of the preceding aspects, the configuration includes a global descriptor data structure, and wherein disabling, by the hypervisor, the virtual machine's access permissions includes disabling the virtual machine's access to modify the global descriptor data structure. In accordance with another example aspect of the present disclosure, which may be used in combination with any one or more of the preceding aspects, determining, by the hypervisor, whether a configuration is secure includes determining whether the virtual machine has a malicious payload. In accordance with another example aspect of the present disclosure, which may be used in combination with any one or more of the preceding aspects, determining, by the hypervisor, whether a configuration is secure includes determining whether the virtual machine has a malicious payload. In accordance with another example aspect of the present disclosure, which may be used in combination with any one or more of the preceding aspects, determining, by the hypervisor, whether a configuration is secure includes determining whether the virtual machine has a malicious payload.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   one or more processors, in communication with the memory;
   one or more virtual machines executing on the one or more processors, each virtual machine including one or more configurations; and
   a hypervisor, including one or more resources, executing on the one or more processors to:
      receive, from the virtual machine, a request to enable privileged access to a hypervisor resource;
      responsive to receiving the request, disable, by the hypervisor, the virtual machine's access permissions to modify a first configuration of the one or more configurations of the virtual machine;
      determine, by the hypervisor, whether the first configuration is secure; and
      responsive to determining by the hypervisor that the first configuration is secure, enable, by the hypervisor, the privileged access to the hypervisor resource.

2. The system of claim 1, wherein the request is a notification that the virtual machine will not modify the first configuration.

3. The system of claim 1, wherein the first configuration includes an interrupt data structure, and wherein disabling, by the hypervisor, the virtual machine's access permissions includes disabling the virtual machine's access to modify the interrupt data structure.

4. The system of claim 1, wherein the first configuration includes a base address register of an interrupt data structure, and wherein disabling, by the hypervisor, the virtual machine's access permissions includes disabling the virtual machine's access to modify the base register of the interrupt data structure.

5. The system of claim 1, wherein the first configuration includes a global descriptor data structure, and wherein disabling, by the hypervisor, the virtual machine's access permissions includes disabling the virtual machine's access to modify the global descriptor data structure.

6. The system of claim 1, wherein determining, by the hypervisor, whether the first configuration is secure includes determining whether the virtual machine has a malicious payload.

7. The system of claim 1, wherein the hypervisor resource includes at least one of a virtual machine function and a hardware device.

8. A method, comprising:
   receiving, from a virtual machine, a request to enable privileged access to a hypervisor resource;
   responsive to receiving the request, disabling, by a hypervisor executing on a computer system, the virtual machine's access permissions to modify a first configuration of one or more configurations of the virtual machine;
   determining, by the hypervisor, whether the first configuration is secure; and
   responsive to determining by the hypervisor that the first configuration is secure, enabling, by the hypervisor, the privileged access to the hypervisor resource.

9. The method of claim 8, wherein the request is a notification that the virtual machine will not modify the first configuration.

10. The method of claim 8, wherein the first configuration includes an interrupt data structure, and wherein disabling the virtual machine's access permissions includes disabling the virtual machine's access to modify the interrupt data structure.

11. The method of claim 8, wherein the first configuration includes a base register of an interrupt data structure, and wherein disabling the virtual machine's access permissions includes disabling the virtual machine's access to modify the base register of the interrupt data structure.

12. The method of claim 8, wherein the first configuration includes a global descriptor data structure, and wherein disabling the virtual machine's access permissions includes disabling the virtual machine's access to modify the global descriptor data structure.

13. The method of claim 8, wherein determining whether the first configuration is secure includes determining whether the virtual machine has a malicious payload.

14. The method of claim 8, wherein the hypervisor resource includes at least one of a virtual machine function and a hardware device.

15. A computer-readable non-transitory storage medium comprising executable instructions that, when executed by a computer system, cause the computer system to:
   receive, from a virtual machine, a request to enable privileged access to a hypervisor resource;
   responsive to receiving the request, disable, by a hypervisor executing on a computer system, the virtual machine's access permissions to modify a first configuration of one or more configurations of the virtual machine;
   determine, by the hypervisor, whether the first configuration is secure; and
   responsive to determining by the hypervisor that the first configuration is secure, enable, by the hypervisor, the privileged access to the hypervisor resource.

16. The computer-readable non-transitory storage medium of claim 15, wherein the request is a notification that the virtual machine will not modify the first configuration.

17. The computer-readable non-transitory storage medium of claim 15, wherein the first configuration includes an interrupt data structure, and wherein disabling, by the hypervisor, the virtual machine's access permissions includes disabling the virtual machine's access to modify the interrupt data structure.

18. The computer-readable non-transitory storage medium of claim 15, wherein the first configuration includes a base register of an interrupt data structure, and wherein disabling, by the hypervisor, the virtual machine's access permissions includes disabling the virtual machine's access to modify the base register of the interrupt data structure.

19. The computer-readable non-transitory storage medium of claim 15, wherein the first configuration includes a global descriptor data structure, and wherein disabling, by the hypervisor, the virtual machine's access permissions includes disabling the virtual machine's access to modify the global descriptor data structure.

20. The computer-readable non-transitory storage medium of claim 19, wherein determining, by the hypervisor, whether the first configuration is secure includes determining whether the virtual machine has a malicious payload.

* * * * *